United States Patent [19]

Di Matteo et al.

[11] 4,202,612
[45] May 13, 1980

[54] ARRANGEMENT FOR SENSING THE GEOMETRIC CHARACTERISTICS OF AN OBJECT

[75] Inventors: Paul L. Di Matteo, Melville; Joseph A. Ross, Fort Salonga; Howard K. Stern, Greenlawn; Lawrence Waszak, Coram, all of N.Y.

[73] Assignee: Solid Photography Inc., Melville, N.Y.

[21] Appl. No.: 912,959

[22] Filed: Jun. 6, 1978

Related U.S. Application Data

[63] Continuation of Ser. No. 755,036, Dec. 28, 1976, abandoned, which is a continuation-in-part of Ser. No. 608,265, Aug. 27, 1975, abandoned.

[51] Int. Cl.² .............. G03B 21/26; G03B 21/20; G01C 11/12; G01B 11/24
[52] U.S. Cl. .................................. 353/28; 33/1 C; 353/102; 356/2; 356/394
[58] Field of Search ............ 356/2, 371, 372, 378, 356/394, 397; 33/1 C; 353/80, 99, 28, 40, 102

[56] References Cited

U.S. PATENT DOCUMENTS

| 1,716,768 | 6/1929 | Edmunds | 33/1 C |
| 2,949,057 | 8/1960 | Polidor | 353/80 |
| 3,479,117 | 11/1969 | Tronnier et al. | 353/102 |
| 3,619,065 | 11/1971 | Agnew | 356/394 |
| 3,866,052 | 2/1975 | Di Matteo et al. | 356/2 |
| 3,884,568 | 5/1975 | Fritzsch | 353/62 |
| 3,894,802 | 7/1975 | Higgins | 356/2 |

Primary Examiner—Steven L. Stephan
Attorney, Agent, or Firm—Max Fogiel

[57] ABSTRACT

A plurality of projectors are positioned in spaced relationship about an object with a surface to be geometrically analyzed. The projectors have cooperating masks which project onto the object illuminated patterns that subdivide the object into predetermined sections. Each mask has a predetermined pattern of sections, and is applied in sequence. The masks are cooperatively advanced in the projectors, with a separate illuminating pattern prevailing on the object each time that the masks are advanced. The combinations of the patterns on the masks define closely-spaced sections subdividing the object. The patterns are coded so that each section is uniquely defined in coded form. Cameras having the entire object within their field of view, photograph the object each time a separate mask is applied. The patterns or sections are parallel planes projected through a mask onto the object.

15 Claims, 17 Drawing Figures

ARRANGEMENT FOR SENSING THE GEOMETRIC CHARACTERISTICS OF AN OBJECT

This is a continuation of application Ser. No. 755,036 filed Dec. 28, 1976, now abandoned, which is a continuation-in-part of the patent application Ser. No. 608,265 filed Aug. 27, 1975, now abandoned.

BACKGROUND OF THE INVENTION

In the reproduction or fabrication of objects with complex surfaces, it is often essential to determine the spatial locations of points on the surface. In order to reproduce or fabricate a surface with substantial precision, it is necessary to specify a substantially large number of closely-spaced points.

Heretofore, the measurements of points on a complex surface was carried out in a laborious manner by recording the positions of the points methodically until the surface has been specified with the required amount of precision. The taking of measurements of the points on the surface often involved making contact with the surface with an instrument, for example. The final amount of recorded data, furthermore, was voluminous and difficult to analyze. In view of the large amount of data which had to be recorded with respect to a large number of points in order to achieve a predetermined precision, it was particularly susceptible to the introduction of measuring and recording errors.

Accordingly, it is an object of the present invention to provide an arrangement in which an object is subdivided into a substantially large number of sections, so that points on the surface of the object may have their positions determined with substantially high resolution.

Another object of the present invention is to provide an arrangement in which each of the subdivided sections of the object is assigned a predetermined code which defines the section uniquely from the other sections.

A further object of the present invention is to provide an arrangement of the foregoing character in which the object is subdivided into sections with a minimum number of masks applied to achieve a predetermined resolution of sections and accompanying precision.

A still further object of the present invention is to provide an arrangement, as described, in which the spatial positions of points within each section may be determined by correlating the points to a reference surface photographed by cameras in cooperation with the projectors and masks.

A particular object of the present invention is to project onto the surface, parallel planes which have sharply defined border lines and are parallel with a substantially high degree of precision.

SUMMARY OF THE INVENTION

The objects of the present invention are achieved by arranging a plurality of projectors with masks about the object with the surface to be geometrically analyzed. Each projector projects a light beam through the respective mask and applies a collimated projected pattern onto the object, which subdivides the object into predetermined sections. For each mask that is applied, the projector illuminates preselected sections of the object. Thie illuminated and non-illuminated sections combine to form a predetermined pattern corresponding to an assigned code. The masks are advanced in the projector in sequence, and produce a separate pattern of illumination on the object for each applied mask. The different patterns, when taken in combination, subdivide the object into a substantially large number of sections, in accordance with a predetermined digital code. The code is selected, in accordance with the present invention, so that a large number of subdivided sections are obtained for a relatively few number of masks or projected patterns on the object.

Each pattern of sections associated with a mask, is photographed by cooperating cameras which have the entire surface within their field of view. The photographs taken by the cameras are correlated to photographs taken similarly of a reference object to establish the spatial locations of points on the surface of the object.

The projectors spaced about the obect with the surface to be analyzed, have cooperating masks so that the illuminated pattern from one projector cooperates correspondingly with the illuminated pattern of the remaining projectors. The plurality of projectors positioned about the object, serve to cover the entire surface of the object.

Selective illumination of the surface by the projectors may be carried out by any one of various forms of electromagnetic radiation available, and the subdivision of the object into sections may be carried out along advantageous axes.

An optical focusing and aperture arrangement is provided so that sharply defined parallel planes are projected onto the surface of the object with a collimated beam.

The novel features which are considered as characteristic for the invention are set forth in particular in the appended claims. The invention itself, however, both as to its construction and method of operation, together with additional objects and advantages thereof, will be best understood from the following description of specific embodiments, when read in connection with the accompanying drawings.

DESCRIPTION OF THE PREFERRED EMBODIMENTS

Figures 1, 1A:
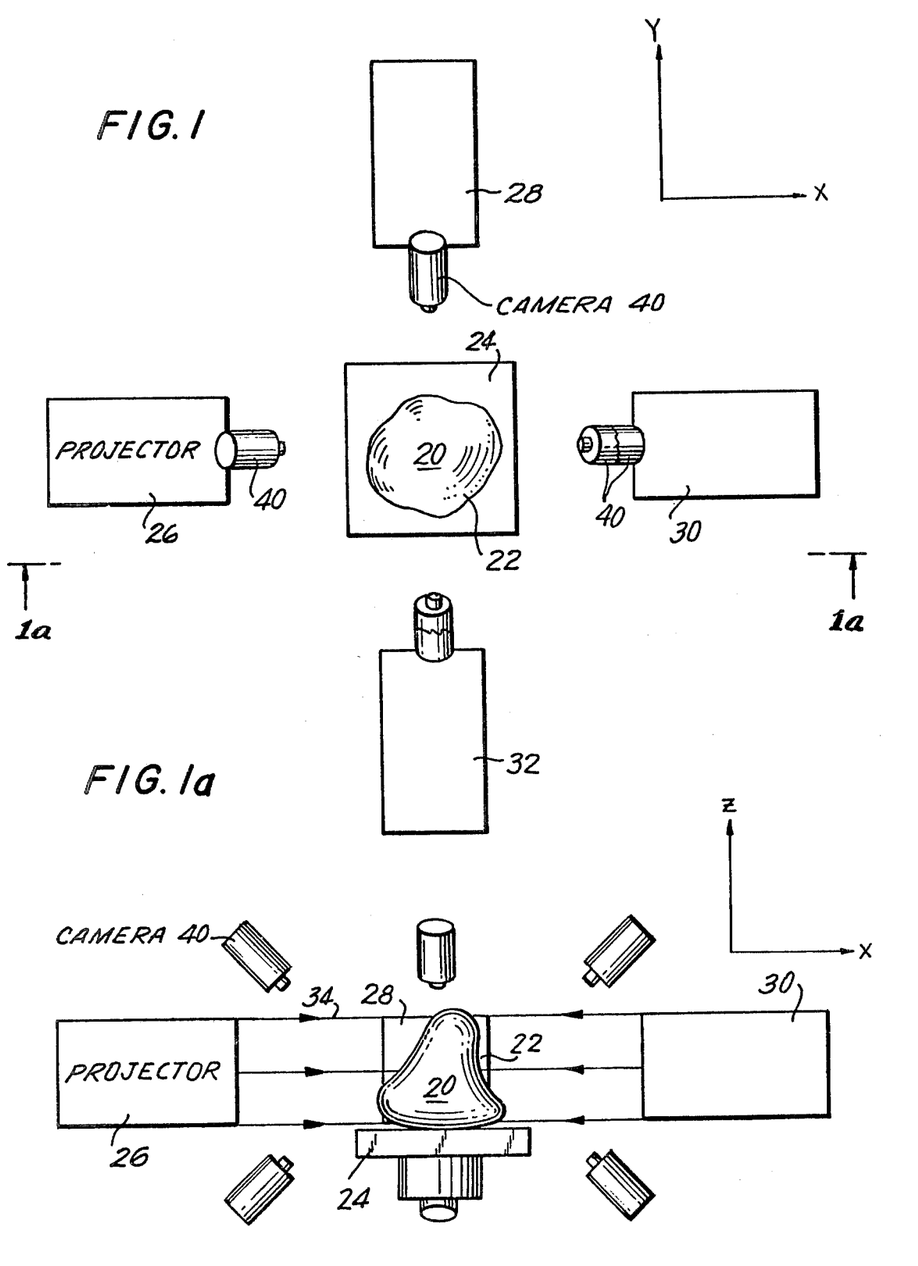
FIG. 1 is a schematic plan view and shows the relative arrangement of the surface to be analyzed or investigated, the projectors, and the cameras, in accordance with the present invention.
FIG. 1a is a schematic elevational view taken along line 1a–1a in FIG. 1.

Referring now to the drawing and in particular to FIG. 1, an object 20 with surface 22 to be geometrically analyzed, is placed on a support 24. Projectors 26, 28, 30, 32 are positioned in spaced relationship about the object 20 for the purpose of covering the entire surface of the object or a predetermined portion thereof. Each projector applies a collimated illuminating beam 34 to the object 20. In the paths of the collimated illuminating beams, are masks 36 which may be advanced in sequence on the projectors.

Figure 3:
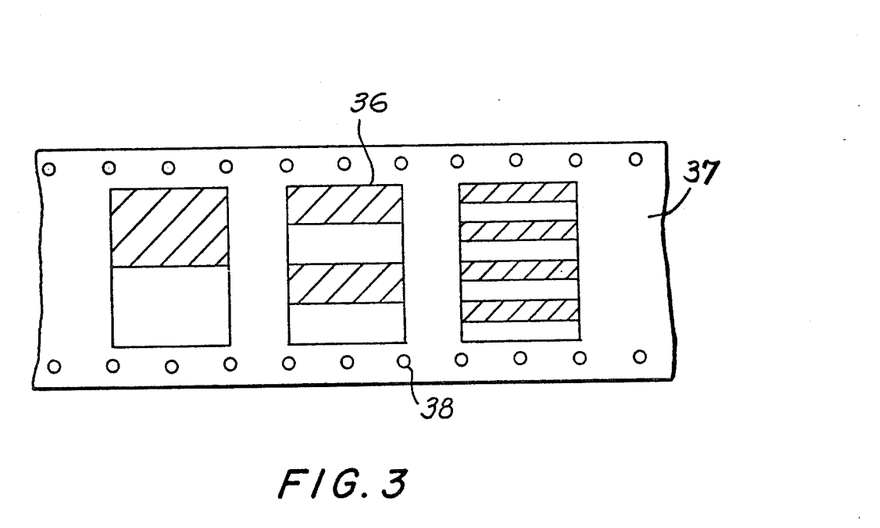
FIG. 3 is a partial plan view of coding masks on a carrier transported in the projectors of FIG. 1.

Each mask 36 may be conveniently placed on a rolled strip of film 37, as shown in FIG. 3 for example. The masks may be advanced in sequence in the respective projector, in an accurately registered manner, by means of sprocket holes 38 located along the edges of the strip of film. The film can be rolled and stored on reels in a conventional manner. The advancing or transporting of film in the light path of a projector is well known in the art, and for this reason is not described in further detail here. At the same time, separate slides each containing a separate mask may be used in conjunction with a projector instead of a strip of film containing a plurality of sequenced masks.

During the period of time that a particular mask is present in a projector, preselected portions of the surface 22 are illuminated by the illuminating beam applied by the projector through the mask. The illumination of the preselected sections is carried out on the basis that the surface 22 is to be subdivided into a substantially large number of sections for a relatively few number of masks. Thus, a relatively few number of masks or illuminating patterns used in conjunction with the projector, provide sufficient data for subdividing the surface 22 into a substantially large number of sections or intervals to obtain sections of high resolution. When the projectors 26, 28, 30, and 32 are operated cooperatively, all projectors are provided with identical masks having identical patterns thereon. This arrangement permits covering the surface of the object and avoids shadow effects which may arise when using only a single projector.

The relationship between the number of masks 36 used in conjunction with a projector, and the number of subdivided sections of the surface 22 is obtained in the following manner.

If the surface 22 is to be subdivided into N sections corresponding to a predetermined precision of resolution, then this quantity N may be expressed by the series of binary terms $$N = 2^0 + 2^1 + 2^2 + 2^3 + 2^4 \ldots$$

Figure 2:
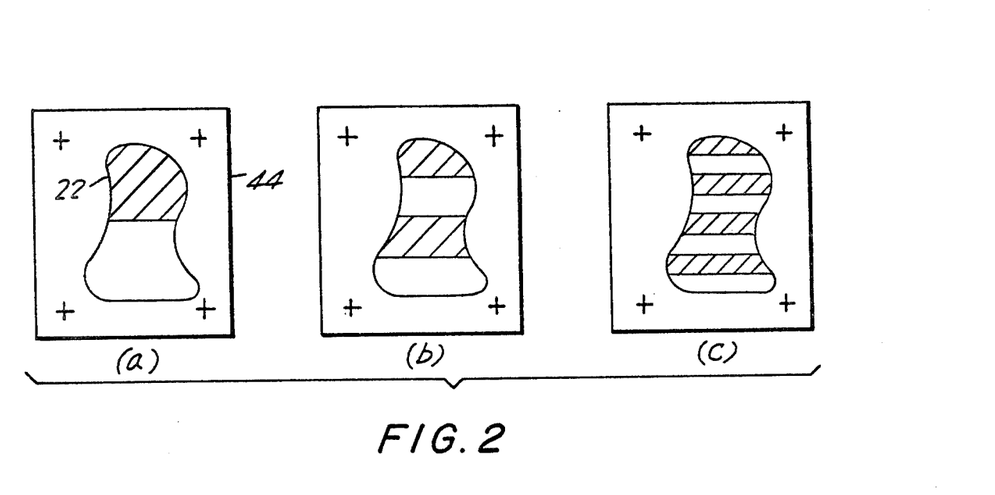
FIG. 2 shows plan views of typical photographs taken by a camera in the arrangement of FIG. 1.

From this series of binary terms, it may be seen that a substantially large number N may be obtained for a relatively few terms present in the sequence. To apply this principle to the present invention, each binary term in the sequence is made to correspond to a single mask pattern projected on the surface 22. For each mask, a predetermined pattern of illumination is applied, corresponding to the particular binary term involved. Thus, for the binary term $2^1$, for example, the illuminating pattern of FIG. 2a is produced. In this pattern, the surface 22 is subdivided into two sections or intervals. The illuminated section in FIG. 2 is shown in crosshatched form. The non-illuminated section is left vacant. In a similar manner, the binary term $2^2$ is represented by the illuminating pattern of FIG. 2b. In FIG. 2b, the surface 22 is subdivided into four sections. FIG. 2c $l$ corresponds, accordingly, to the binary term $2^3$, and in this FIG. 2c, the surface 22 is subdivided into eight sections or intervals.

Each illuminating pattern as represented by FIGS. 2a, 2b, and 2c, for example, is photographed by cameras 40 which have the entire surface 22 within their field of view. Whereas only three patterns are represented in the drawing to correspond to three separate binary terms, in practice the cameras 40 photograph each pattern separately for as many binary terms as are necessary to obtain the quantity N. For each photograph taken by the cameras 40, moreover, the projectors 26, 28, 30, 32 project onto the object, a single pattern of a single mask.

The sectionalized pattern on the masks may be obtained, for example, by producing the film or slides with alternating sections or areas that will transmit and inhibit the transmission of light. The photographs 44 taken by the cameras 40 of the sectionalized patterns appearing on the object 20, are shown in FIG. 2.

In the use of the pure binary code to express the number N of subdivisions of the surface 22, as described above, each subdivision or band is assigned a unique code which serves to identify uniquely each band from the other remaining bands. Thus, bands numbered 5, 6 and 7 have, respectively, assigned codes 101000, 011000, and 111000. In a similar manner, every other band from the first one to the last one (band N) has a uniquely assigned binary code.

In accordance with the present invention, therefore, a relationship exists between the binary coded bands and the number of photographs 44 taken by the cameras 40. The relationship makes it possible for a relatively small number of photographs to include complete information of a substantially large number of bands. Thus, only ten photographs are required, for example, to specify completely 1,000 bands.

Figure 4:
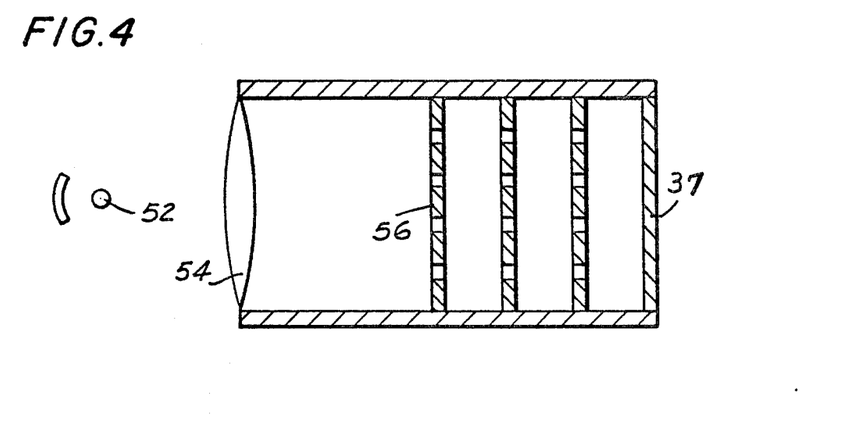
FIG. 4 is a schematical elevational view of an arrangement for obtaining a collimated beam of light for use in conjunction with the projectors and coding masks.

In the operation of the projectors and masks, in accordance with the present invention, it is desirable for the projectors to provide collimated beams of light. One method of obtaining a collimated beam of light for use in conjunction with the present invention, is shown in FIG. 4. In this arrangement, a source of light or illumination 52 directs light through a condenser 54 which serves as a collimating lens. The light emerging from the collimating lens 54 will still diverge somewhat, and for purposes of improving the beam of light at substantial distance from the lens 54, collimating masks 56 are further provided. These collimating masks 56 serve to limit the light path to the extent that a substantial collimated beam of light can be directed through the masks of FIG. 3, for example.

Figure 5:
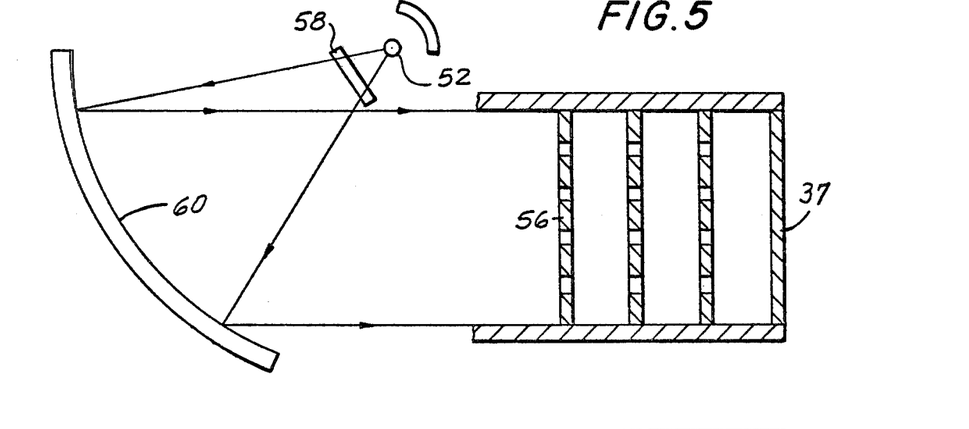
FIG. 5 is a front view of another embodiment for obtaining a collimated beam of light.
Figure 6:
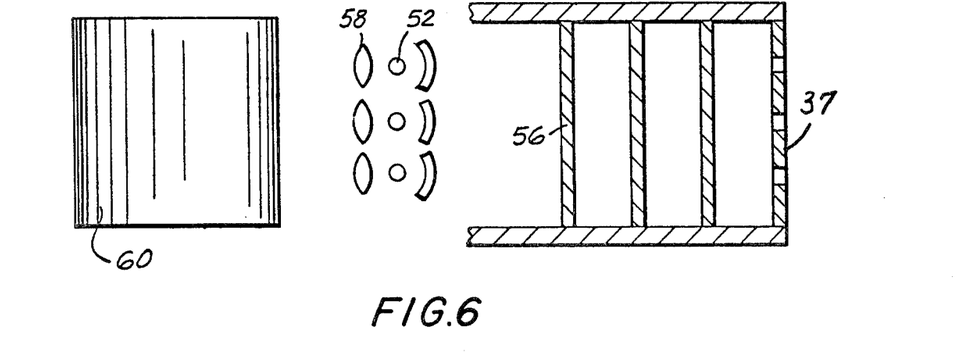
FIG. 6 is a plan view of the arrangement of FIG. 5.

In another embodiment for obtaining collimated beams of light, the source of illumination 52 is operated in conjunction with a cylindrical lens 58 and a cylindrical reflecting surface 60, as shown in FIGS. 5 and 6. After reflecting from the cylindrical surface 60, the light is further passed through collimating masks 56 in FIG. 5, for the purpose of further improving the light beam for use in conjunction with the masks. The arrangement of FIG. 5 uses, thereby, a cylindrical lens and a cylindrical reflecting surface to replace the condenser 54.

For purposes of obtaining substantially uniform light distribution along the length of a coding mask, the source of light or illumination may be in the form of, for example, three light sources distributed uniformly along the length of the coded masks, as shown in FIG. 6. FIG. 6 is a plan view of FIG. 5. In this arrangement of using multiple light sources, each separate light source is provided with a separate cylindrical lens 58, as shown in FIG. 6.

Figure 7:
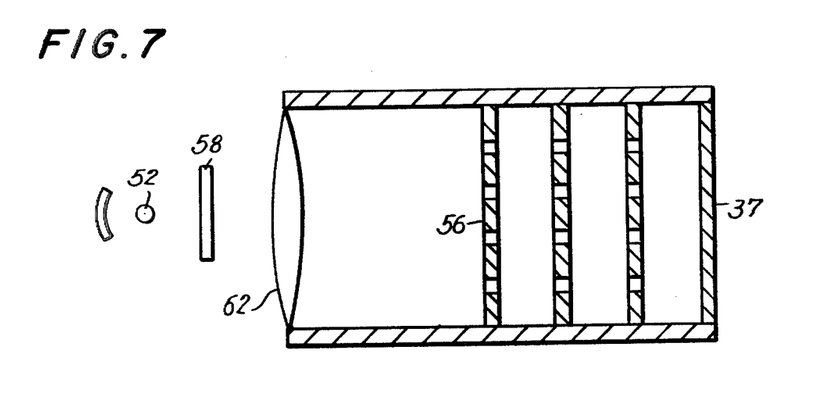
FIG. 7 is a front view of a still further embodiment for obtaining a collimated beam of light.
Figure 8:
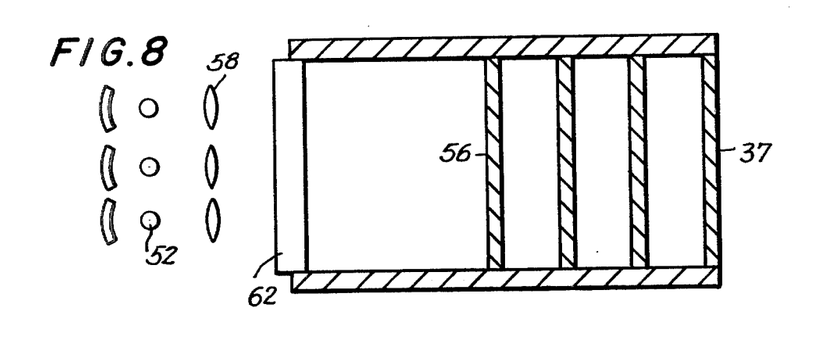
FIG. 8 is a plan view of the arrangement of FIG. 7.
Figure 9:
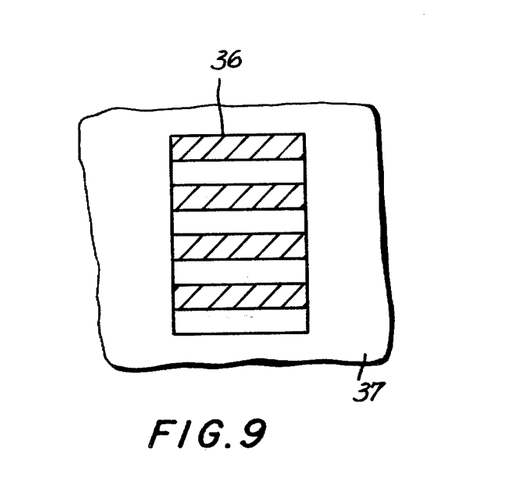
FIG. 9 is a plan view of a coding mask on a film used in the embodiment of FIGS. 7 and 8.

In a still further embodiment for obtaining collimated beams of light in the projectors of the present invention, a multiple number of light sources 52 distributed along the length of a coding mask, direct light through individual cylindrical focusing lenses 58, as shown in FIGS. 7 and 8. FIG. 8 is a plan view of FIG. 7. The light passing through the individual focusing lenses 58, is directed, furthermore, through a single condenser 62 used for the purpose of distributing uniformly the light from the individual lenses 58 across the length of the coding mask, and to collimate the beam. In the use of the arrangement of FIGS. 7 and 8, the light after passing through the collimating masks 56, passes through one of the masks 36 on the film strip 37.

Figure 10:
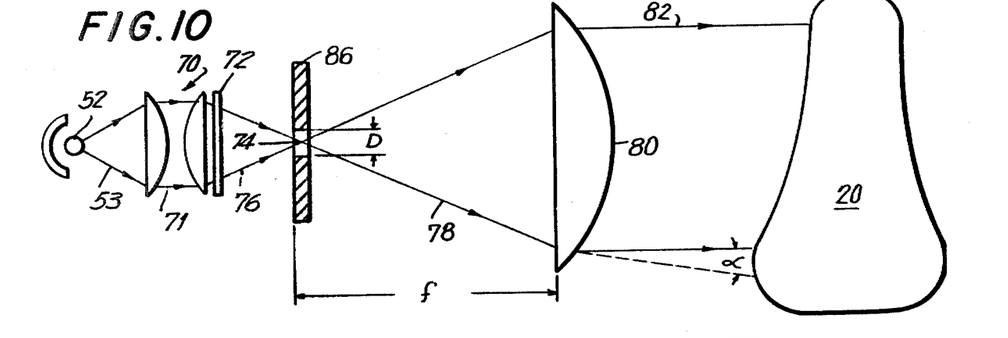
FIG. 10 is a schematic elevational view and shows an embodiment for obtaining sharply defined parallel planes with collimated light projected onto the surface of the object, in accordance with the present invention.

In accordance with a particularly advantageous embodiment of the present invention, the collimated light beam for projecting parallel planes on the surface of the object 20, is produced in accordance with the arrangement of FIG. 10. A cone of light 53 from the source 52 is applied to a condenser lens system 70 through which the light passes in a path indicated schematically by 71. A mask or slide 72 with the planar configuration which is to be projected onto the object, is located in front of the condenser system 70. The latter condenses the light and focuses the rays to the focal point thereof at the location 74. After passing through the slide or mask 72, the cone of condensed light is represented in FIG. 10 by the outline 76.

After passing through the focal point 74, the rays diverge again and a divergent cone of light 78 is applied to a projector lens 80. The projector lens 80 is located so that its focal point coincides with the point 74. The emerging light beam 82 from the projector lens 80, is applied to the object surface 22, for example.

In practice, the light source 52 is not a point source, and as a result of the finite physical size of the source, the light rays 76 are not focused to a point 74, but to a substantially small circular area having a finite diameter. As a result of the light being focused to such a small area instead of a point, the light beam 82 emerging from the projector lens 80 is not a precisely parallel beam. Instead, the beam 82 diverges and projects onto the object surface 22 a blurred image on the slide or mask 72.

To avoid a blurred image of planes, an aperture 86 is located in the plane containing the focal point 74. This plane is also located at a distance f from the projector lens 80, which is equal to the focal length of this lens.

The aperture 86 serves to reduce the area through which the condensed light may pass on its way to the projector lens 80. Thus, the aperture 86 has an opening of diameter D which is smaller than the diameter of the circular area to which the light rays 76 are condensed. By reducing the diameter D of the opening in the aperture element 86, the light rays 82 emerging from the projector lens 80 become less divergent, and as a result the image projected on the object surface 22 has a sharper definition. The relationship between the diameter D of the aperture opening and the divergence $\alpha$ of the light beam 82 is given by $$\alpha = D/f$$

From this relationship, it may be seen that the smaller the diameter D is made, the more precisely parallel will be the beam 82. The aperature element 86 serves to block a portion of the unwanted light focused in the plane of the aperture element 86 by the condenser system 70, and prevents, thereby, the appearance of a blurred image of non-parallel planes on the projected surface. In an ideal situation, the light source 52 is made a point source, and the condenser system 70 focuses all of the light from the source to a focal point 74 instead of a small finite area in the plane containing that point. Under such ideal conditions, the aperture element 86 is not required, since blockage of light rays is not needed.

Figure 11:
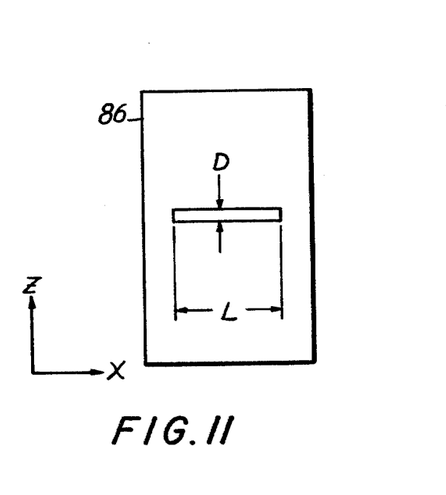
FIG. 11 is a plan view of an aperture element in the arrangement of FIG. 10.

In the use of the present invention for projecting parallel planes on an object surface, precisely parallel rays are required only in the direction of a coordinate axis which is normal to the planes. Thus, if the planes are projected as horizontal planes in the configuration of FIG. 1a, these planes are normal to the Z axis. Under those conditions, it is essential that the projected light rays do not diverge along the Z axis, but remain instead normal to this axis. In the direction parallel to the planes, however, the light rays may be permitted to diverge. Thus, when viewing the plan view of FIG. 1, the light rays may diverge along the Y or X axis. Non-parallel rays in these Y and X directions will not interfere with sharply defined planes projected on the object surface, if the rays are parallel to each other and normal to the Z axis, for example. When the light rays are permitted to diverge in this manner, in one direction but not in the other, the aperture element 86 may be constructed as shown in FIG. 11. The aperture opening under these conditions, is in the form of an elongated slot having a width D and a length L exceeding substantially the dimension of the slot width. Thus, the aperture element 86 serves to restrict light passage in the Z direction, but does not restrict the passage of light in the X direction. These directions shown in FIG. 11 are consistent with those shown in FIGS. 1 and 1a.

When the number of planes to be projected exceed the number of planes which can be imaged by a single arrangement as shown in FIG. 10, then it is possible to stack several such arrangements or systems as in FIG. 10, one on top of the other, for example, so that any desired number of projected planes may be obtained. Similarly, projectors may be stacked side by side in the X direction so as to project planes that are wider than is obtainable from a single system such as shown in FIG. 10. Accordingly, a multiple number of systems of FIG. 10 may be stacked in both the Z and X directions to obtain the desired configuration of planes. In view of such configuration of planes and the construction of the aperture element 86 as shown in FIG. 11, it is possible to use cylindrical lenses instead of spherical lenses for the optical elements in the system. The curvature of such cylindrical lenses would then lie in the Z-X or Z-Y planes (FIGS. 1 and 1a), but not in the Y-X plane.

Figure 12:
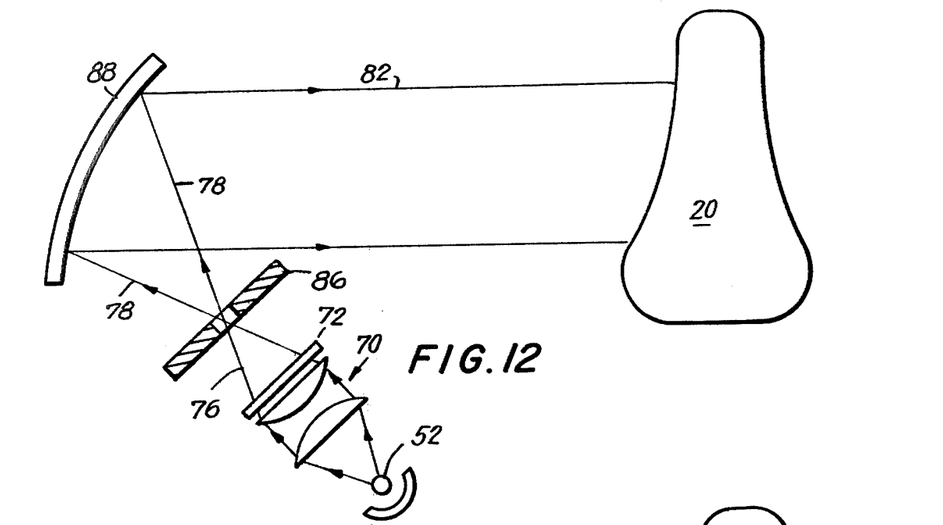
FIG. 12 is another embodiment of the arrangement of FIG. 10, in which the projector element is in the form of a reflector.

In applying the arrangement of FIGS. 10 and 11, it is not essential that all of the elements be located along a single straight-lined axis. Instead, a more compact unit may be obtained with the construction shown in FIG. 12. In this FIG. 12, a mirror 88 is used in place of the projecting lens 80 and serves as both a projecting and deflecting element, whereby the beam of light is deflected in direction from the aperture element 86 to the object surface 22. In this construction of FIG. 12, the projector unit may be made smaller or more compact, since the elements 52, 70, 72 and 86 are located within the space between the projecting mirror 88 and the object surface 22.

Figure 13:
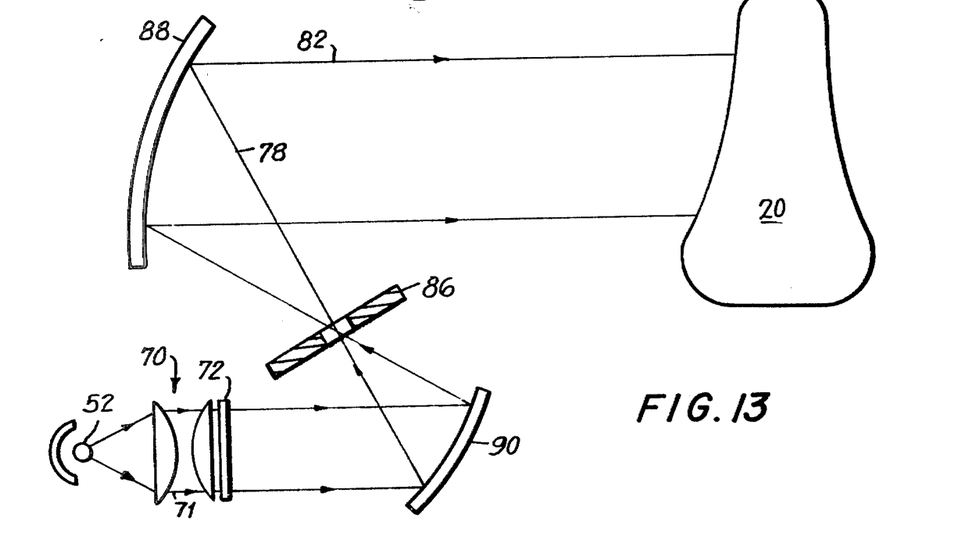
FIG. 13 is a further embodiment of the arrangement of FIG. 12.

FIG. 13 shows an alternate construction in which an additional reflecting surface or mirror 90 is used to further deflect the beam onto the projecting mirror 88. This arrangement permits the light source to be substantially beneath the mirror 88 and to direct the light rays in a direction other than directly onto the mirror surface 88. Thus, the additional reflector 90 permits additional flexibility in positioning the light source 52 together with the condenser unit 70 and the slide 72.

Figure 14:
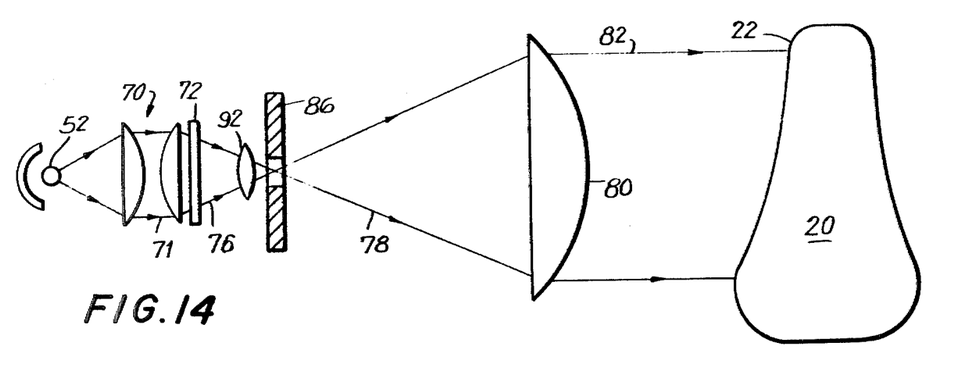
FIG. 14 is an additional embodiment of the arrangement of FIG. 10 with means for correcting against aberration.
Figure 15:
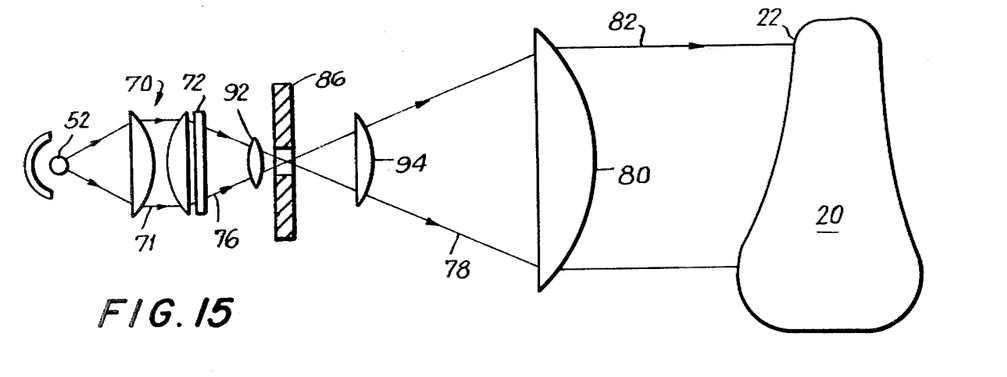
FIG. 15 is a further embodiment of the arrangement of FIG. 14.

To correct for aberrations, a correcting lens 92 may be placed in front of the aperture element 86, as shown in FIG. 14. An additional correcting lens 94 may be located between the aperture element 86 and the projecting lens 88, as shown in FIG. 15. The lens 94 has also the effect of reducing the length of the optical path between the light source 52 and the projecting lens 88, so that the projecting system may be constructed as a more compact unit.

Figure 16:
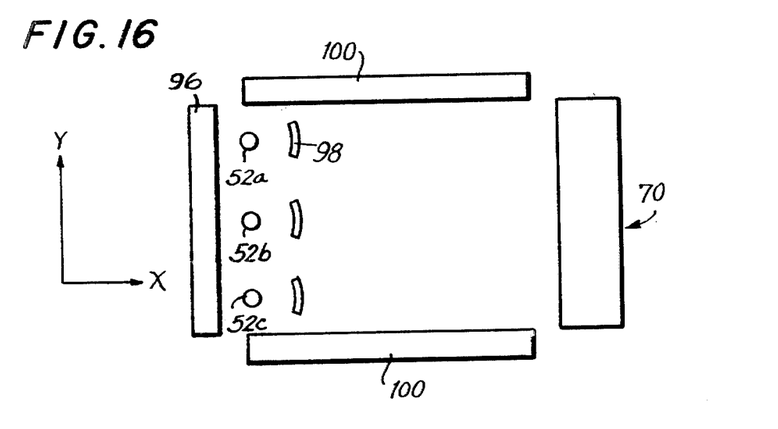
FIG. 16 is a plan view and shows the construction of a light source with cylindrical optical elements, in accordance with the present invention.

Commensurate with the construction of the aperture element 86 as shown in FIG. 11, in which the width D of the slit is made very narrow while the length L of the slit is substantially unrestricted, the light source may be arranged in accordance with the construction of FIG. 16. This figures shows the arrangement in which the light source is comprised of multiple elements 52a, 52b and 52c, for example. These multiple elements are located side-by-side along the longitudinal direction of the slit or aperture opening. The effect of such a multiple arrangement of light elements, is to increase the intensity of light of the plane images that are projected on the object surface 22, without reducing the sharp definition of the projected planes. Thus, the light source for this purpose, may be considered a line source which lies in the Y-X plane when considering the views of FIGS. 1 and 1a. The line source may be approximated by close spacing of the multiple elements 52a, 52b and 52c, or an elongated line-shaped filament may be applied for this source.

To further aid in gathering the light rays which originate from the source and direct them towards the condenser system 70, a cylindrical reflecting surface 96 may be located behind the sources 52a, 52b and 52c. As already noted above, the reflector 96 may have a cylindrical surface rather than a spherical surface, for the purpose of imaging planes on the surface 84. Additional cylindrical lenses 98 may be located in front of the sources, moreover, for the purpose of increasing their apparent size in the Y-X plane, without increasing their size in the Z-X plane, for example. To aid in relating FIG. 16 with respect to FIGS. 1 and 1a, reference coordinate axes Y-X are shown in FIG. 16.

To prevent loss of light resulting from diverging rays, planar reflecting surfaces 100 may be located on the side of the optical path, as shown in FIG. 16. Such plane mirrors 100 have their plane surfaces lying in the Z-X plane. The side reflectors 100 serve to redirect the light energy, that would otherwise be lost, into the optical system for imaging planes onto the surface 84.

The reflector 96 at the back of the light sources, also provide for an improvement in the source by imaging rays reflected by its surface so that these rays fill in the open spaces of coils of the filaments, in the case of a tungsten filament, for example. By filling in these open spaces of the filament coils, the area of the source is increased without increasing the overall size of the source.

Without further analysis, the foregoing will so fully reveal the gist of the present invention, that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. An arrangement for projecting a plurality of parallel lines onto a surface comprising in combination: a source of electromagnetic radiations; said lines having a spacing independent of the distance to said surface from said source; means with focal point for condensing radiated energy rays from said source and focusing them to a condensed bundle onto a plane containing the focal point of said condensing means; projecting means having a focal point coinciding with the focal point of said condensing means, energy rays leaving said projecting means being substantially parallel in one direction; and mask means between said condenser means and the focal point thereof, said mask means carrying lines parallel to each other and to be projected onto said surface; planes containing said energy rays between said projecting means and said surface being parallel to each other, lines on said mask means being projected by said projecting means as parallel elements spaced from each other independent of distance of points on said surface from said mask means; the spacing between any two lines, being constant along the distance between said projecting means and said surface and independent of the magnitude of said distance; an observer with an eye in a plane parallel to said planes containing said energy rays and looking toward said projecting means seeing light coming from a line source parallel to said plane; the location of the line source being different for each plane.

2. The arrangement as defined in claim 1 including aperture means in said plane containing the focal point of said condensing means; said condensed bundle of energy rays having a predetermined dimension, said aperture means having an opening surrounding the focal point of said condensing means and said projecting means, said opening of said aperture means having a dimension substantially smaller than said predetermined dimension of said condensed bundle for inhibiting preselected rays in said bundle from being transmitted by said projecting means to prevent said lines from blurred border lines.

3. The arrangement as defined in claim 2 wherein said aperture means has an elongated slit-shaped opening having dimensions of width and length, the width of said slit extending in a direction normal to the parallel rays, the length of said slit-shaped opening being substantially greater than the width; said preselected rays being inhibited in said direction normal to the parallel rays, said bundle having a dimension parallel to said length of said aperture which is smaller than said aperture length so that energy rays in said bundle are uninhibited in a direction parallel to said length and are substantially transmitted by said projecting means.

4. The arrangement as defined in claim 1 including cylindrically-shaped reflector means behind said source of electromagnetic radiation for gathering and reflecting energy rays originating from the rear of said source, said cylindrically-shaped reflector means rays directing rays reflected by said reflector means onto said source or path from said source to said condensing means; and cylindrical lens means in front of said source for increasing the apparent size of said source in the direction normal to said one direction; said cylindrical reflector means having a focal line; said source comprising a plurality of sources located substantially on the focal line of said cylindrical reflector means.

5. The arrangement as defined in claim 1 wherein said mask means carries images of parallel planes to be projected onto said surface.

6. The arrangement as defined in claim 1 wherein said condensing means and said projecting means comprises cylindircal lenses.

7. The arrangement as defined in claim 1 wherein said projector means comprises a cylindrical reflector.

8. The arrangement as defined in claim 7 including auxiliary reflector means between said mask means and said plane containing said focal point.

9. The arrangement as defined in claim 2 including correcting lens means in front of said aperture means for correcting against aberration.

10. The arrangement as defined in claim 9 including auxiliary correcting lens means between said aperture means and said projecting means.

11. The arrangement as defined in claim 4 including plane reflector means on the sides of the path of said energy rays, the surface of said plane reflector means being normal to said focal line of said cylindrical reflector means.

12. The arrangement as defined in claim 4 wherein said source comprises a tungsten filament with coils, said cylindrical reflector means reflecting the energy rays so that they fill the open spaces of the coils of said filament for increasing the area of said source while retaining constant the overall size of said source.

13. The arrangement as defined in claim 3 wherein said energy rays leaving said projecting means diverge at an angle equal to the ratio of the width of said slit-shaped opening to the focal length of said projecting means.

14. A method for projecting a plurality of parallel lines onto a surface comprising the steps of: generating electromagnetically radiated energy rays; condensing said energy rays and focusing said rays to a condensed bundle on a predetermined plane, said condensed rays diverging after passing said predetermined plane; gathering and directing said rays after passing said predetermined plane so that said rays lie in first substantially parallel planes; said rays being also in second planes which are substantially non-parallel and orthagonal to said first planes; and modulating said rays for projecting onto said surface a plurality of parallel lines, planes containing said energy rays after said gathering and directing step to points on said surface being parallel to each other, said parallel lines projected onto said surface being spaced from each other independent of the distance of the points on said surface from said predetermined plane.

15. The method as defined in claim 14 including the step of blocking a portion of the rays at said predetermined plane, the rays being blocked in at least one direction for reducing divergence of the rays after gathering and projecting onto said surface.

* * * * *